United States Patent
Capricho et al.

(10) Patent No.: US 11,618,838 B2
(45) Date of Patent: Apr. 4, 2023

(54) INCORPORATION OF BORON COMPLEX INTO RESIN

(71) Applicant: Hexion Inc., Columbus, OH (US)

(72) Inventors: Jaworski C. Capricho, Deer Park (AU); Karen Theresa Love, Springfield (NZ); Alex Bruce, Tauranga (NZ); Gary Byrom, Tauranga (NZ); Robert B. Currie, Tauranga (NZ)

(73) Assignee: HEXION INC., Columbus, OH (US)

( * ) Notice: Subject to any disclaimer, the term of this patent is extended or adjusted under 35 U.S.C. 154(b) by 834 days.

(21) Appl. No.: 15/486,998

(22) Filed: Apr. 13, 2017

(65) Prior Publication Data

US 2017/0298260 A1  Oct. 19, 2017

Related U.S. Application Data

(60) Provisional application No. 62/324,757, filed on Apr. 19, 2016.

(51) Int. Cl.
| | |
|---|---|
| *C09J 161/06* | (2006.01) |
| *C09J 5/00* | (2006.01) |
| *C08K 3/013* | (2018.01) |
| *C08K 3/26* | (2006.01) |
| *C08K 5/55* | (2006.01) |

(52) U.S. Cl.
CPC .............. *C09J 161/06* (2013.01); *C09J 5/00* (2013.01); *C08K 3/013* (2018.01); *C08K 5/55* (2013.01); *C08K 2003/265* (2013.01); *C09J 2401/006* (2013.01); *C09J 2461/00* (2013.01)

(58) Field of Classification Search
None
See application file for complete search history.

(56) References Cited

U.S. PATENT DOCUMENTS

| | | | | |
|---|---|---|---|---|
| 4,814,039 A | * | 3/1989 | Willging | ................ C09J 103/02 156/328 |
| 4,915,766 A | * | 4/1990 | Baxter | ..................... B32B 7/12 156/335 |
| 5,079,067 A | * | 1/1992 | Willging | .................. C08G 6/00 428/182 |
| 5,763,338 A | | 6/1998 | Sean | |
| 6,881,814 B2 | | 4/2005 | Tang et al. | |
| 2002/0182431 A1 | | 12/2002 | Hatton et al. | |
| 2007/0007686 A1 | | 1/2007 | Reid | |
| 2014/0275360 A1 | * | 9/2014 | Williamson | ............. C08H 6/00 524/72 |
| 2015/0274930 A1 | | 10/2015 | Jon et al. | |

FOREIGN PATENT DOCUMENTS

| | | |
|---|---|---|
| CN | 1438284 A | 8/2003 |
| CN | 101514211 A | 8/2009 |
| CN | 104449461 A | 3/2015 |
| CN | 104893614 A | 9/2015 |

OTHER PUBLICATIONS

M.L. Selbo, Adhesive Bonding of Wood, Technical Bulletin No. 1512, Aug. 1975.
Charles R. Frihart, Introduction to Speical Issue Wood Adhesives: Past, Present, and Future, Forest Products Journal, vol. 65 No. 1/2 (pp. 4-8).
Abdalla, M. O., Ludwick, A. & Mitchell, T. Boron-modified phenolic resins for high performance applications. Polymer (Guildf). 44, 7353-7359 (2003).
Caldeira, F. Boron in Wood Preservation a Review in its Physico-Chemical Aspects. Silva Lusit. 18, 179-196 (2010).
Chattopadhyay, AK. "Boring" boron and adhesives, Adhesives Seal Industry, vol. 21. No. 9 (p. 38, col. 3), Aug. 13, 2014.
Freeman, M. H., McIntyre, C. R. & Jackson, D. A Critical and Comprehensive Review of Boron in Wood Preservation.
Gao, W., Cao, J.-Z. & Jian-Zhang Li. Effect of Ammonium Pentaborate on Curing of Aqueous Phenol Formaldehyde Resin. Iran. Polym. J. 19, 255-264 (2010).
Kawamoto, A. M., Pardini, L. C., Diniz, M. F., Lourenço, V. L. & Takahashi, M. F. K. Synthesis of a boron modified phenolic resin. J. Aerosp. Technol. Manag. 2, 169-182 (2010).
Lei, Y. & Wu, Q. Cure Kinetics of Aqueous Phenol-Formaldehyde Resins Used for Oriented Strandboard Manufacturing: Effect of Zinc Borate. J. Appl. Polym. Sci. 101, 3886-3894 (2006).
Liu, R., Cao, J., Xu, W. & Li, H. Study on the Anti-Leaching Property of Chinese Fir Treated With Borate Modified By Phenol-Formaldehyde Resin. Wood Res. 57, 111-120 (2012).
Mourant, D., Yang, D. Q., Lu, X., Riedl, B. & Roy, C. Copper and boron fixation in wood by pyrolytic resins. Bioresour. Technol. 100, 1442-1449 (2009).
Xu, P. & Jing, X. Pyrolysis of hyperbranched polyborate modified phenolic resin. Polym. Eng. Sci. 50, 1382-1388 (2010).
Yuca, B et al., Determination of the influence of some boric acid adhesives on combustion properties of beech wood, Kastamonu Uni. Orman Fakultesi Dergisi vol. 14 No. 2 182-190.
Zmihorska-Gotfryd, A. Phenol-formaldehyde resols modified by boric acid. Polimery 51, (2006).

\* cited by examiner

*Primary Examiner* — Alicia Chevalier
*Assistant Examiner* — Elaine M Vazquez

(57) ABSTRACT

Complexes, compositions, articles of manufacture, and method for making the same are provided herein. In one embodiment, a borate-polyol complex may be prepared by reacting a boron-containing compound and a polyol to form a reaction mixture and then neutralizing the reaction mixture to form a neutralized borate-polyol complex. The neutralized borate-polyol complex may then be used in combination with polymeric resins to form adhesive products, among other material products, which products can be in manufacturing articles.

13 Claims, No Drawings

INCORPORATION OF BORON COMPLEX INTO RESIN

RELATED APPLICATION DATA

This application claims benefit to U.S. Provisional Application No. 62/324,757, filed Apr. 19, 2016, of which the entire contents of the application are incorporated by reference herein.

BACKGROUND OF THE INVENTION

Field of the Invention

The present invention relates to boron-containing compositions. The present invention particularly relates to boron-containing adhesive composition and process for making the same.

Background of the Art

Historically, boron chemicals have been used for the purpose of wood preservation, fire resistance, and termite protection, among other benefits. However, boron chemicals have limited penetration into various wood articles. Further, painted solid timber or laminated veneer lumber (LVL) articles, Plywood articles, the boron chemicals can even have more limited penetration due to the presence of the adhesive glue lines. Thus, it is of interest and value to the industry to have boron chemicals/methods that allow the Boron to penetrate into the veneer more thoroughly than the current standard in the industry. One way to achieve this is to introduce the Boron into the adhesive mixture. This allows the treatment chemical to penetrate into the surrounding wood/veneer.

There are specific chemicals in the industry which can be added to phenolic resins in an attempt to introduce the treatment chemicals into plywood and LVL via the adhesive applied to the surface of each veneer. In the past adding boron compounds to the alkaline phenolic resoles used in plywood and LVL has failed due to a number of technical issues. However, when a phenolic resin is mixed with a boron compound such as boric acid, a boron salt or monoethanolamine boric acid mixtures, a boron phenolic complex is formed. Importantly, complexes of this type are known to have a range of undesirable side effects, such as a large viscosity build up to gelation point of the phenolic resin and decreased wood fiber failure/lesser adhesive bond quality when boron is added at very small amounts (more than 0.02% weight). Boron compounds are also reported to retard the phenolic condensation reaction which is also not desirable when it is used in a wood adhesive.

It would be desirable in the art to provide boron-containing compounds and compositions, and methods for the making the same, which allow adequate penetration of wood articles without undesirable property changes to the wood article.

SUMMARY OF THE INVENTION

Embodiments of the invention are directed to boron complexes, boron-containing compositions including adhesive compositions, and the processes for making the complexes and compositions and their application.

In one aspect, the invention is a neutralized borate-polyol complex. The neutralized borate-polyol complex may be in a composition having an excess of alkali than is needed to neutralize the boron.

In another aspect, the invention provides for an adhesive composition including a neutralized borate-polyol complex, a polymeric material, and water. The polymeric material may be a phenol-formaldehyde or resorcinol-formaldehyde resin.

In another aspect, the invention provides for an article of manufacture including an adhesive composition comprising a neutralized borate-polyol complex, a polymeric material, and water; and a cellulose based substrate. The polymeric material may be a phenol-formaldehyde or resorcinol-formaldehyde resin.

In another aspect, the invention provides a process for forming a complex including reacting a boron-containing compound and a polyol to form a reaction mixture and neutralizing the reaction mixture to form a neutralized borate-polyol complex.

In another aspect, the invention provides a process for forming an adhesive composition including reacting a boron-containing compound and a polyol to form a reaction mixture, neutralizing the reaction mixture to form a neutralized borate-polyol complex, and mixing the neutralized borate-polyol complex with at least a polymeric material. The polymeric material may be a phenol-formaldehyde or resorcinol-formaldehyde resin.

In another aspect, the invention provides a process for making a manufactured article from wood including forming an adhesive composition by a process, comprising reacting a boron-containing compound and a polyol to form a reaction mixture, neutralizing the reaction mixture to form a neutralized borate-polyol complex, and mixing the neutralized borate-polyol complex with at least a polymeric material, and applying the adhesive composition to a cellulose-based substrate. The polymeric material may be a phenol-formaldehyde or resorcinol-formaldehyde resin.

DETAILED DESCRIPTION

Embodiments of the invention are directed to boron-containing complexes and compositions, and the processes for making the boron-containing complexes and compositions. It has been observed that the boron-containing compositions as described herein exhibit improved stability, especially when mixed with phenolic resins, than prior art boron-containing compositions.

In one embodiment, the boron-containing composition is an adhesive composition including a neutralized borate-polyol complex, a polymeric material, and water. In a further embodiment, the neutralized borate-polyol complex may be in a composition having an excess of alkali than is needed to neutralize the boron.

As defined herein, alkali is a basic, ionic salt of an alkali metal (Group I) or alkaline earth metal (Group 2) chemical elements. Suitable alkalis are alkali hydroxides. Examples of alkali hydroxides include sodium hydroxide, potassium hydroxide, calcium hydroxide, magnesium hydroxide, and combinations thereof. Preferably sodium hydroxide is used as the alkali. Alkali may also be referred to herein as an alkali material. While the examples herein, and some of the description herein, reference sodium hydroxide, the invention contemplates the use of all potential alkali hydroxides as such alkali have the same or similar chemical interactions as others in the group as known and understood by one skilled in the art.

The neutralized borate-polyol complex may be formed by reacting a boron-containing component with a polyol to form a borate-polyol complex and neutralizing the reaction mixture to formed in a neutralized borate-polyol complex.

The boron-containing component may include a compound selected from the group consisting of boric acid, sodium borate, Borax, sodium metaborate (It also includes any other metal or amine salts of Boron) and combinations thereof. The boron-containing component comprises from about 2% weight (wt. %) to about 50 wt. %, such as from about 5 wt. % to about 30 wt. % (such as from about 10 wt. % to about 30 wt. %), for example, from about 8 wt. % to about 17.5 wt. % (for example, from about 16.5 wt. % to about 17.5 wt. %) of the neutralized borate-polyol complex.

The polyol may be a diol, triol, or other polyol having 4 or more hydroxyl groups. Suitable polyols may be selected from the group consisting of glycerol, ethylene glycol and propylene glycol, and combinations thereof. The polyol comprises from about 1 wt. % to about 90 wt. %, such as from about 20 wt. % to about 75 wt. % (such as from about 40 wt. % to about 75 wt. %), for example, from about 25 wt. % to about 60 wt. % (for example, from about 56 wt. % to about 60 wt. %) of the neutralized borate-polyol complex.

Neutralizing the reaction mixture to form a neutralized borate-polyol complex may be achieved by adding a neutralizing material to the borate-polyol complex. The neutralizing material may be a hydroxide selected from the group of sodium hydroxide (caustic soda), potassium hydroxide, ammonia hydroxide, and combinations thereof. The hydroxide comprises from about 1 wt. % to about 75 wt. % (from about 1 wt. % to about 35 wt. %), such as from about 15 wt. % to about 70 wt. % (such as from about 15 wt. % to about 30 wt. %), for example, from about 23 wt. % to about 60 wt. % (for example, from about 23 wt. % to about 25 wt. %) of the neutralized borate-polyol complex. Preferably, the neutralizing material is added in excess to the borate-polyol complex. Alternatively, the neutralizing material is added to avoid excess alkali as the complex may precipitate some alkali salts.

The total amounts of the boron-containing component, the polyol, and the neutralizing material comprises 100 wt. % of the neutralized borate-polyol complex.

The borate-polyol complex may have an acidic pH level from about 1 to less than 7, for example, from about 1 to about 2.

The neutralized borate-polyol complex may have a basic pH level greater than 7, such as from greater than 7 to about 13 (from greater than 7 to about 12), for example, from about 8 to about 11.5 (from about 8 to about 10).

The neutralized borate-polyol complex may have a refractive index (RI) at 25° C. from about 1.3 to about 1.6, such as from about 1.43 to about 1.46, for example, 1.4485.

The neutralized borate-polyol complex may have a specific gravity at 20° C. from about 1.1 to about 1.5, such as from about 1.3 to about 1.4, for example, 1.3475.

The neutralized borate-polyol complex may have a viscosity at 25° C. from about 100 to about 2000 cPs (centipoise), such as from about 200 to about 1500 cPs, for example, 830 cPs.

In one embodiment, neutralized borate-polyol complex may be formed by a process comprising mixing and reacting the 1,2-polyol and the boron-containing component at a temperature from about 20° C. to about 90° C., such as from about 65° C. to about 80° C., until the boron-containing component has dissolved, producing a borate-polyol complex solution having a pH from about 1 to about 2. This borate-polyol complex solution was then neutralized with the neutralizing material. The neutralizing process is an exothermic reaction with reaction ending temperatures from about 20° C. to about 120° C., usually 70-110° C.

In one embodiment of the invention, an adhesive composition is formed with the neutralized borate-polyol complex.

The adhesive composition may include the neutralized borate-polyol complex, a polymeric material, and water. The adhesive composition may further include one or more material selected from the group consisting of an inorganic filler material, an extender, an organic filler material, an alkali material, and combinations thereof The polymeric material may be a material selected from the group of phenol resin (phenolic resins), resorcinol resins, lignins, tannins, polyphenols, and combinations thereof. Suitable resins may be selected from the group of resorcinol-formaldehyde resins, phenol-resorcinol-formaldehyde resins, phenol-formaldehyde resins, and combinations thereof. Preferably, the polymeric material comprises a phenol-formaldehyde or resorcinol-formaldehyde resin. The polymeric resins could also be used, neat, to prepare a glue mix, in a ready to use system (RTU) or supplied as a reactor complete adhesive (RCA).

For the adhesive composition, the polymeric material may comprise from about 20 wt. % to about 50 wt. %, such as from about 25 wt. % to about 40 wt. %, for example, from about 70 wt. % to about 75 wt. % of the adhesive composition at 42% solids. The polymeric material may be provided in a solution form with the polymeric material forming solids in an amount between 30 wt. % and 45 wt. % of the solution.

For the adhesive composition, the neutralized borate-polyol complex may comprise from about 0.5 wt. % to about 10 wt. %, such as from about 1.0 wt. % to about 6.0 wt. %, for example, from about 2 wt. % to about 5 wt. % of the adhesive composition.

The adhesive composition may include one or more optional materials, selected from the group consisting of inorganic fillers, extenders, organic fillers, and combinations thereof. Examples of inorganic fillers include calcium carbonate, talc, and combinations thereof. Examples of extenders include wheat flour, starch, gluten, and combinations thereof. Examples of organic fillers include coconut shell flour, walnut shell flour, pure dried cob (PDC), corn cob residue (CCR) (furfural residues) and combinations thereof.

If present in the adhesive composition, the sum of the one or more optional materials may comprise from about 1 wt. % to about 30 wt. %, such as from about 1 wt. % to about 25 wt. %, for example, from about 19 wt. % to about 21 wt. % of the adhesive composition.

Alternatively, the one or more optional materials may each comprise individual amounts in the adhesive composition. The inorganic fillers may comprise from about 0 wt. % to about 16 wt. % of the adhesive composition, and if present in the adhesive composition, the inorganic fillers may comprise from about 0.01 wt. % to about 16 wt. %, such as from about 2 wt. % to about 15 wt. %, for example, from about 10 wt. % to about 14 wt. % of the adhesive composition. The extenders may comprise from about 0 wt. % to about 25 wt. % of the adhesive composition, and if present in the adhesive composition, the extenders may comprise from about 1 wt. % to about 25 wt. %, such as from about 1 wt. % to about 20 wt. %, for example, from about 1 wt. % to about 14 wt. % of the adhesive composition. The organic fillers may comprise from about 0 wt. % to about 16 wt. % of the adhesive composition, and if present in the adhesive composition, the organic fillers may comprise from about 0.01 wt. % to about 16 wt. %, such as from about 2 wt. % to about 15 wt. %, for example, from about 10 wt. % to about 14 wt. % of the adhesive composition.

Commercial phenolic resins are supplied at different molecular weights and different alkali to phenol levels (% alkali) For example, in the adhesive composition, the phenolic resins moles of alkali (for example, a Group I hydroxide, such as sodium hydroxide) to phenol may vary from about 0.075:1 to 1.5:1, such as from 0.5:1 to 1:1, for example from about 0.7:1 to 0.9:1 of the adhesive composition. Examples of suitable phenolic resins are the phenol-formaldehyde resins Cascophen™ P6594 resin (about 5 wt. % alkali as sodium hydroxide on liquid phenolic resin) and Cascophen™ P6619 resin (about 8 wt. % alkali as sodium hydroxide on liquid phenolic resin).

It is believed that in order to prevent gelling of the neutralized borate-polyol complex, a minimum alkali level need to be maintained in the composition. Gelling of the neutralized borate-polyol complex is evidence of an unstable complex. It is believed that such a minimum alkali level in an adhesive composition comprising a phenolic resin allows the phenol hydroxyl groups in the resin to be in the alkali salt form. It is further believed that such a minimum alkali level prevents a boron-phenolic resin complex forming between phenol OH and methylol group and maintains the boron as a diester anion. Preferred phenolic resins moles of alkali to phenol are from about 0.65:1 or greater, such as from 0.65:1 to 1.1:1, for example, from 0.7:1 to 1:1 or 0.7:1 to 0.9:1.

Some phenolic resins have a sufficient alkali level that no additional alkali is necessary. Examples are Cascophen™ P6614 resin, Cascophen™ P6490 resin, and Cascophen™ P6619 resin, which all exhibit a phenolic resins moles of alkali to phenol of about 0.8:1. Where the phenolic resin has a lower alkali amount, such as Cascophen™ P6601 resin, and Cascophen™ P6611 resin, which all exhibit a phenolic resins moles of alkali to phenol of about 0.6:1, it is likely additional alkali hydroxide material will be added to the composition to reach the desired ratios.

If needed, and in addition to the neutralizing material to the borate-polyol complex, an alkali material may be added to the adhesive composition. The alkali material may be sodium hydroxide, potassium hydroxide, calcium hydroxide, magnesium hydroxide, and combinations thereof. The alkali material may be present in the adhesive composition from about 0.01 wt. % to about 10 wt. %. The adhesive composition may be added to the adhesive composition directly, introduced as excess neutralizing material to the borate-polyol complex, introduced in the polymeric material, or a combination thereof.

A process for forming an adhesive composition includes reacting a boron-containing compound and a polyol to form a reaction mixture, neutralizing the reaction mixture to form a neutralized borate-polyol complex, and mixing the neutralized borate-polyol complex with at least a polymeric material.

In one embodiment, the process for mixing the neutralized borate-polyol complex with at least a polymeric material includes adding resin and the inorganic filler to a mixer. The extender is then added to the mixer. The organic filler may be added over time, such as from 0.01 to 20 minutes. Following the addition of the extender, the components may be mixed for a first period of time, such as from 0.01 to 20 minutes. Next, the neutralized borate-polyol complex is added to the reactor, and, optionally, the components may be mixed for a second period of time, such as from 0.01 to 40 minutes. Water may then be added, and optionally, and, optionally, the components may be mixed for a third period of time, such as from 20 to 40 minutes.

The adhesive composition may be used to form an article of manufacture. The article of manufacture may include a cellulose based substrate and an adhesive composition as described herein.

The cellulose based substrate may be a material selected from the group of solid timber, veneer (rotary of sliced), flakes of wood and combinations thereof.

In one embodiment, the process for making an article of manufacture includes applying the adhesive composition to one or more cellulose-based substrates.

The adhesive composition may be applied by any conventional means in the art to the surface of the wood including a glue line, an envelope treatment, a dip, a spray process or combinations thereof. Adhesive compositions are applied in grams per meter square and are applied to one or two side of the piece if veneer depending on the equipment used. In one example, the adhesive composition is applied in the range from about to 140 to about 270 (in the range from about 180 to about 270) grams per meter square. The amount of adhesive composition added may depend on open time required as well as substrate thickness with longer open times or thicker substrates needing higher application amounts.

BAE is defined as the boric acid equivalent and is used as a measure of the amount of boron present in a piece of treated timber. The term BAE is used as a general term to cover all boron types as a wide range of boron complexes are used in timber treatment.

To achieve the required BAE level for the product some boron may be introduced via the glue line as in this method and the rest applied by an envelope treatment method so that total amount of BAE is achieved. The glue line treatment method is very effective at getting higher level of BAE in the center of the glued products.

EXAMPLES

The following examples are provided to illustrate aspects of the invention. The examples are not intended to limit the scope of the invention and they should not be so interpreted. Amounts are in weight parts or weight percentages unless otherwise indicated. The pH was measured using a radiometer analytical probe, calibrated at 25° C. as presented in the Australian Standard AS 1321.7-1977. The refractive index is measured using an automatic refractometer, Index Instrument PTR 2a X using the Australian Standard 1321.10-1980. The specific gravity was measured using a density cup, calibrated at 20° C. using ASTM standard ASTM D891-09. Viscosity was measured using a Brookfield viscometer with a 3 spindle equipped running at 30 rpm using the Australian Standard AS 1321.9-1977.

Example 1

Preparation of a Boron-Polyol Complex

The boron complex was prepared by mixing 1167.4 g of glycerol and 339.6 g of boric acid together at a temperature of 75° C. until the boric acid dissolved, producing a solution of pH 1.6. This solution was then slowly neutralized with 472 g of 46 wt. % caustic soda (NaOH), which exothermic reaction resulted in warming to 105° C. The resulting product was sodium borate-glycerol complex, which can also be described as a sodium borate-glycerol condensation complex.

The observed properties of the sodium borate-glycerol complex were a Color of Yellow, a pH level of 9.4, a refractive index (RI) at 25° C. of 1.4485, a specific gravity (SG) at 20° C. of 1.3475, and a viscosity at 25° C. of 828 centipoise (cPs) as per the related Australia New Zealand standard.

Example 2

Preparation of an Adhesive Composition with a Neutralized Boron-Polyol Complex

A) The boron complex was prepared by dissolving 10 grams of borax (sodium borate) in 13 g of glycerol while the mixture is heated to 105° C. in a 250 mL beaker with a spin bar. The temperature was lowered to ambient and 7 g of water was charged to dilute the mixture. The resultant product was a boric acid-glycerol complex, referred to as boron-glycerol complex A.

B) The boron complex was prepared by dissolving 10 grams of borax (sodium borate) in 13 g of glycerol while the mixture is heated to 105° C. in a 250 mL beaker with a spin bar. The temperature was lowered to ambient and 7 g of water was charged to dilute the mixture. The final pH of the solution was set to a pH of 10 using sodium hydroxide. The resultant product was a sodium borate-glycerol complex, referred to as boron-glycerol complex B. The pH is set to about 9-10 as this is the point at which there are no free acid groups on the complex. Alkaline phenolic resins thicken very quickly if pH decreases below about 10 and may become insoluble, thus pH is controlled.

C) The boron complex was prepared by dissolving 20 grams of boric acid in 80 g of glycerol while the mixture is heated to 105° C. in a 250 mL beaker with a spin bar until completely dissolved (approximately 20 minutes). The mixture was allowed to cool to lower than 40° C. and then 12.9 g of sodium hydroxide pellets were charged and the stirring continued until a clear viscous mixture was obtained. The resultant product was a sodium borate-glycerol complex, referred to as boron-glycerol complex C.

All of the boron-glycerol complexes A-C made were mixed with a phenol formaldehyde resin, Cascophen™ P6619 resin and were observed for stability, as measured by viscosity, on standing for days as well as stability when used as a component in adhesive compositions. Further, wood panels were made using borax-glycerol complex mixed with a phenol-formaldehyde resin, Cascophen™ P6619 resin. Cascophen™ P6619 resin comprises 8 wt. % alkali in phenolic resin.

For forming an adhesive composition with the boron-glycerol complexes A-C, the following composition was used:

616 g P6619, the phenol-formaldehyde resin (8 wt. % alkali as sodium hydroxide in phenolic resin)
100 g Calcium carbonate
100 g Wheat flour, extender
90 g Boron-glycerol complexes A, B, or C, and
90 g Water.

The process for forming the adhesive composition includes adding resin and the inorganic filler to a mixer. Adding the extender over time, such as from 0 to 5 minutes, for example, 3 minutes, to the reactor and mixing for a first period of time, such as from 5 to 10 minutes, for example, 6 minutes. Adding a boron-glycerol complex to the reactor, mixing for a second period of time, such as from 0 to 10 minutes, for example, 5 minutes and then adding water, and mixing for a third period of time, such as from 0 to 10 minutes, for example, 2 minutes.

For the composition above, the process for forming the adhesive composition includes adding phenol-formaldehyde resin and the calcium carbonate to a mixer. Adding wheat flour over 3 minutes to the reactor and mixing for 6 minutes. Adding a boron-glycerol complex to the reactor, mixing for 2 minutes, and then adding water, and mixing for two minutes.

The boron-glycerol complexes A tended to coagulate instantly when mixed with phenolic resin. However, boron-glycerol complex B and C did not exhibit this behavior to coagulate instantly when sodium hydroxide was added to the boron-glycerol mixture. With boron-glycerol complex C, the adhesive composition was 61 poise at 25° C., which dropped to 18 poise at 25° C. after water addition. After 2 hours the viscosity was 32 poise at 25° C., and after 18 hours the viscosity had risen to 53 poise at 25° C. This showed that the glue mix was stable over the typical time period required on a plant to make panels.

It is believed that when a boron compound such as boric acid or borax is mixed with glycerol, apart from complex formation, a considerable amount of acid is produced. This acidic mixture is incompatible with phenolic resins of higher pH values. Thus, there is a need to neutralize this acidity before mixing with the resin. Once, neutralized, the boron complexes will be stable in the mixture even for days. Neutralization of acidity drives complex formation forward and may lead to good boron fixation.

Laminated veneer lumber (LVL) panels were made with the borate adhesive composition using 4.1 mm veneer, 7 ply, and a 37 to 42 g spread per 40×40 cm sheet. A first panel, Panel 1, had 15 minutes pre-press (9 kgf/cm2) prior to 20 minutes hot press (150° C., 12 kgf/cm2). A second panel, Panel 2, had 0 minutes pre-press, and 28 minutes hot press.

Wood panels made with the adhesive composition described above exhibited a VP (Vacuum pressure) bond rating range from 3 to 7, with an average of 4 for Panel 1, which was hot pressed for 20 minutes; and a VP bond rating range from 4 to 9, with an average of 6 for Panel 2, which was hot pressed for 28 minutes. When the samples were exposed to the pressure-steam, the bond test results increased by 1 overall. A "turmeric test" showed clear evidence of boron situated in the glue lines of the LVL.

Bond rating is based on EWPAA (engineered wood products association of Australasia rating system where a 0 is 0% wood fiber failure and a 10 is 100% wood fiber failure. An acceptable exterior bond has an average bond rating above 5.

Example 3

Preparation of an Adhesive Including the Boron-Polyol Complex

The boron complex was prepared by mixing 275 g of glycerol and 80 g of boric acid together at a temperature of 75° C. until the boric acid dissolved, producing a solution of pH 1.6. This solution was then slowly neutralized with 116.1 g of 46 wt. % caustic soda (NaOH), which exothermic reaction resulted in warming to 105° C. The resulting product was sodium borate-glycerol complex, which can also be described as a sodium borate-glycerol condensation complex.

The sodium borate-glycerol complex was included in an adhesive composition, which is as follows:

| Material: | weight (g) | Wt. % |
|---|---|---|
| Cascophen ™ P6619 resin | 616 | 71.54 |
| Calcium carbonate | 100 | 11.61 |
| Wheat flour | 80 | 9.29 |
| Sodium borate-glycerol complex | 20 | 2.32 |
| Water | 45 | 5.23 |

Laminated veneer lumber (LVL) panels were made with the adhesive composition using 45 mm veneer, 11 ply, and a glue spread of 258.6 grams/m$^2$.

Example 4

Preparation of an Adhesive Including the Boron-Polyol Complex

The sodium borate-glycerol complex of Example 1 was included in an adhesive composition, which is as follows:

| Material: | weight (g) | Wt. % |
|---|---|---|
| Cascophen ™ P6619 resin | 1232 | 71.54 |
| Calcium carbonate | 200 | 11.61 |
| Wheat flour | 200 | 11.61 |
| Sodium borate-glycerol complex | 40 | 2.32 |
| Water | 50 | 2.90 |

Three (3) panels of 45 mm LVL were made using 3.65 mm veneer pieces. The glue spread aim was 45.0 g per 40 by 40 cm$^2$. The panel preparation conditions were an open assembly time 5, 15 or 25 minutes, a cold press time was 10 minutes at 7 kgf/cm$^2$, a closed assembly time was 10 minutes, and a hot press time was 30 minutes at 150° C. and 12 kgf/cm$^2$. The average vacuum pressure bond quality (VPBQ) data and the average 6 hour pressure steam bond (PSB) data is as follows in Table 1:

TABLE 1

| Open assembly time | VPBQ | PSB | Analysis |
|---|---|---|---|
| 5 minutes | 2.42 | 2.54 | Unacceptable |
| 15 minutes | 6.13 | 5.33 | Acceptable |
| 25 minutes | 6.63 | 7.83 | Excellent |

The bond quality improves significantly as the open assembly time is increased. This work also showed that the glue spread was too high and was lowered in subsequent work to achieve an acceptable bond on short open assembly times.

Example 5

Comparison Data Involving Alkali Compounds

Panels made with a comparison of sodium borate-glycerol complex and alkali hydroxides were compared to a composition having neither. The adhesive system used is a reactor complete phenolic resin (RCA) which is a commercial type of phenolic resin which has about 4 wt. % to 6.5 wt. % alkali as sodium hydroxide. The RCA adhesives have extenders added and fillers added in the resin manufacturing plant. 100 parts of the RCA adhesives is generally used with 0 wt. % (none) to 8 wt. % of a resorcinol based catalyst like Cascoset MCAT9128. The sodium borate-glycerol complex was foriiied by Example 1 was included in an adhesive composition, which is as follows:

| Material: | Control weight (g) | Boron complex mix weight (g) |
|---|---|---|
| Cascophen ™ P6594 resin | 100 | 100 |
| Calcium carbonate | 0 | 0 |
| Wheat flour | 0 | 0 |
| Sodium borate-glycerol complex | 0 | 3.45 |
| MCAT9128 catalyst | 2 | 2 |
| Sodium hydroxide (46 wt. %) | 0 | 3 |
| Water | 0 | 0 |

The control, which was free of sodium borate-glycerol complex, was mixed for 10 minutes and was observed to have a viscosity of about 2800 cps at 25° C. and remained stable for 5 hours. The sodium borate-glycerol complex and sodium hydroxide composition was mixed for 10 minutes and was observed to have a viscosity of about 3700 cps at 25° C. and remained stable for 5 hours.

Panels of 45 mm LVL were made using 3.65 mm veneer pieces. The panels were prepared using the Cascophen™ P6594 RCA (about 5 wt. % alkali as sodium hydroxide on liquid phenolic resin) and a catalyst MCAT9128. Sodium hydroxide was added to the P6594 RCA to keep the boron complex stable.

The glue spread aim was 160 to 170 grams per square meter. The panel preparation conditions were an open assembly time 5 minutes, and a hot press time was 28 minutes at 140° C. and 14 kgf/cm$^2$. The average vacuum pressure bond quality (VPBQ) data and the average 6 hour pressure steam bond (PSB) data is as follows in Table 2:

TABLE 2

| Open assembly time | VPBQ | PSB | Analysis |
|---|---|---|---|
| Control 5 minutes | 6.5 | 6.6 | Good |
| Complex 5 minutes | 6.4 | 6.6 | Good |

However, as shown in Table 3 where Boron is measures in the central ⅕th of wood and wood products, the invention shows improved results.

TABLE 3

| Boron treated Material | Wt. % BAE on oven dried wood |
|---|---|
| Solid wood H1.2 standard | 0.03 to 0.07 wt. % |
| Soaked LVL in commercial Boron solution | 0.01 to 0.03 wt. % |
| LVL with Boron added via glue line treatment | 0.10 wt. % |

Samples of LVL where Boron complex was added to the phenolic resin as per this invention at 0.1 wt. % BAE equivalent on Oven dried wood and Sap wood. This LVL was subsequently treated by a soaking of the LVL or spray of the LVL to achieve BAE levels of greater than 0.5 wt. % and in most cases 1.0 wt. % BAE. This method showed levels of BAE in the central ⅕ of the LVL much greater than can normally be achieved in solid wood.

Example 6

Gellation Example and Chart

Example 6 illustrates gelling or non-gelling at different alkali amounts for the same resins. This example illustrates that increasing alkali corresponds to improved stability, less or no gelling. In initial wt. % alkali phenolic (5 wt. % alkali as sodium hydroxide on liquid phenolic resin) show a gel is formed with the neutralized borate-polyol complex. As more alkali (sodium hydroxide) is added when an alkali on phenol mole ratio of about 0.65:1 is reached, such as 0.68:1 or 0.7:1 is reached, the phenolic resin does not gel with the neutralized borate-polyol complex as shown in Table 4. The alkali to phenol ratio is based on the total alkali as sodium hydroxide that is in the phenolic resin regardless of the originating source.

TABLE 4

| | | Resin | | | | |
|---|---|---|---|---|---|---|
| P6594 (g) | Added Alkali 46 wt. % Sodium Hydroxide (g) | Neutralized Borate-Polyol Complex Sodium Borate-Polyol Complex (g) | Viscosity In Cps At 25° c. | | | Molar Ratio Of Alkali To Phenol |
| | | | after 20 min | after 60 min | after 180 min | Molar Ratio (X:1) |
| 100.00 | 0.00 | 3.45 | gel | gel | gel | 0.56 |
| 100.00 | 1.00 | 3.45 | gel | gel | gel | 0.62 |
| 100.00 | 2.00 | 3.45 | 1052 | 1144 | 1148 | 0.68 |
| 100.00 | 3.00 | 3.45 | 638 | 574 | 630 | 0.74 |
| 100.00 | 4.00 | 3.45 | 426 | 402 | 448 | 0.80 |
| 100.00 | 0.00 | 5.20 | gel | gel | — | 0.59 |
| 100.00 | 1.00 | 5.20 | gel | gel | — | 0.63 |
| 100.00 | 2.00 | 5.20 | 1432 | 1496 | — | 0.68 |
| 100.00 | 3.00 | 5.20 | 628 | 650 | — | 0.73 |
| 100.00 | 4.00 | 5.20 | 414 | 345 | — | 0.77 |

While the present invention has been described and illustrated by reference to particular embodiments, those of ordinary skill in the art will appreciate that the invention lends itself to variations not necessarily illustrated herein.

What is claimed is:

1. An adhesive composition, consisting of:
   a neutralized borate-polyol complex, the polyol of the neutralized borate-polyol complex selected from the group consisting of a diol, a triol, a polyol having 4 hydroxyl groups, and combinations thereof;
   a phenol-formaldehyde or resorcinol-formaldehyde resin;
   optionally, one or more materials selected from the group consisting of an inorganic filler material, an organic filler material, an alkali hydroxide material, and combinations thereof; and
   water.

2. The adhesive composition of claim 1, wherein the neutralized borate-polyol complex comprises a borate-polyol complex neutralized with a hydroxide.

3. The adhesive composition of claim 2, wherein the polyol of the neutralized borate-polyol complex is selected from the group consisting of glycerol, ethylene glycol, propylene glycol, and combinations thereof.

4. The adhesive composition of claim 1, wherein the borate of the neutralized borate-polyol complex is a boron material derived from the group consisting of boric acid, sodium borate, sodium metaborate, and combinations thereof.

5. The adhesive composition of claim 1, wherein the neutralized borate-polyol complex is formed by a process comprising:
   reacting glycerol and boric acid to form a complex, and
   adding sodium hydroxide to the complex to neutralize the complex to form the neutralized borate-polyol complex.

6. The adhesive composition of claim 1, wherein the neutralized borate-polyol complex has a pH from greater than 7 to about 11.5.

7. The adhesive composition of claim 1, wherein the adhesive composition comprises:
   from about 0.5 to about 10 wt. % of the neutralized borate-polyol complex;
   from about 20 to about 50 wt. % of the phenol-formaldehyde or resorcinol-formaldehyde resin (100% solids);
   optionally from about 1 wt. % to about 30 wt. % of the one or more materials; and
   water.

8. The adhesive composition of claim 7, wherein the one or more materials comprises from about 0.01 wt. % to about 10 wt. % of an alkali hydroxide material.

9. The adhesive composition of claim 7, wherein the one or more materials comprises:
   from about 0.01 to about 15 wt. % of an inorganic filler; and
   from 0 to about 16 wt. % of an organic filler.

10. The adhesive composition of claim 1, wherein the polyol of the neutralized borate-polyol complex is selected from the group consisting of a diol, a triol, and combinations thereof.

11. An article of manufacture, comprising:
    an adhesive composition consisting of:
        a neutralized borate-polyol complex, the polyol of the neutralized borate-polyol complex selected from the group consisting of a diol, a triol, a polyol having 4 hydroxyl groups, and combinations thereof;
        a phenol-formaldehyde or resorcinol-formaldehyde resin;
        optionally, one or more materials selected from the group consisting of an inorganic filler material, an organic filler material, an alkali hydroxide material, and combinations thereof; and
        water; and
    a cellulose based substrate.

12. The article of claim 11, wherein the cellulose based substrate is a material selected from the group consisting of solid timber, rotary of sliced veneer, flakes of wood, and combinations thereof.

13. The article of claim 11, wherein the polyol of the neutralized borate-polyol complex is selected from the group consisting of a diol, a triol, and combinations thereof.

* * * * *